A. J. RIGGS.
WEEDER.
APPLICATION FILED OCT. 27, 1914.
1,149,949.
Patented Aug. 10, 1915.
2 SHEETS—SHEET 1.
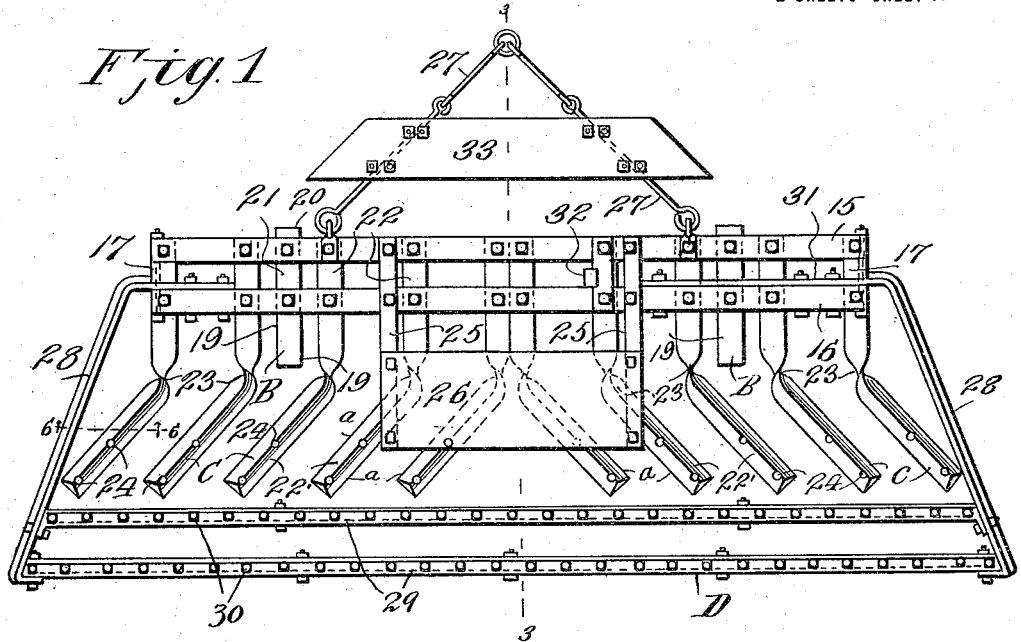
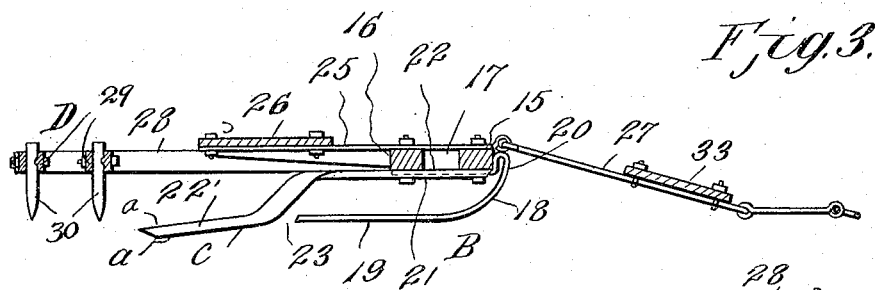
Inventor
Arthur J. Riggs,
Witnesses
Frank Hough
Wm. Dagger.
By Victor J. Evans
Attorney A. J. RIGGS.
WEEDER.
APPLICATION FILED OCT. 27, 1914.
1,149,949.
Patented Aug. 10, 1915.
2 SHEETS—SHEET 2.
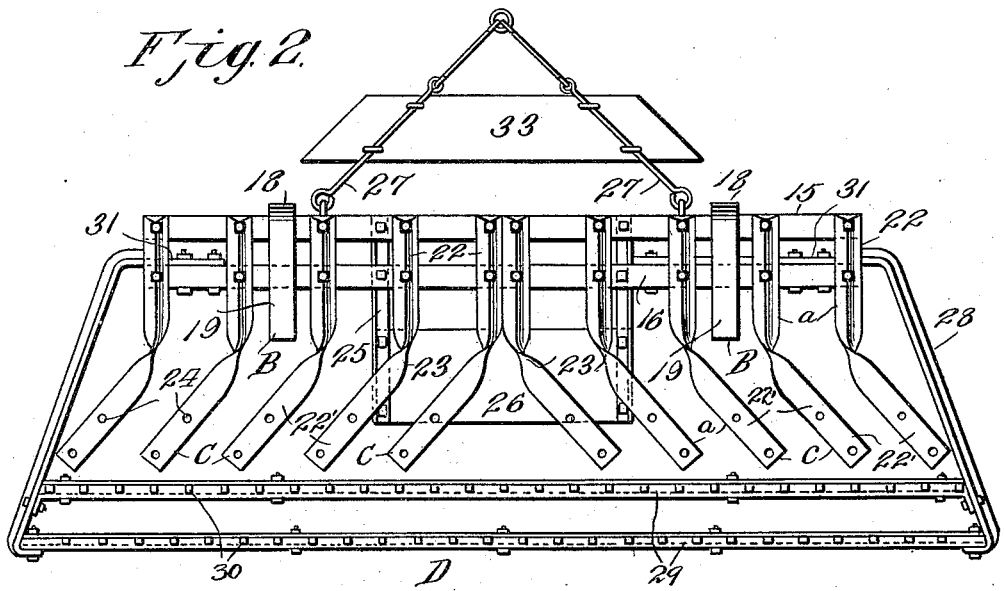
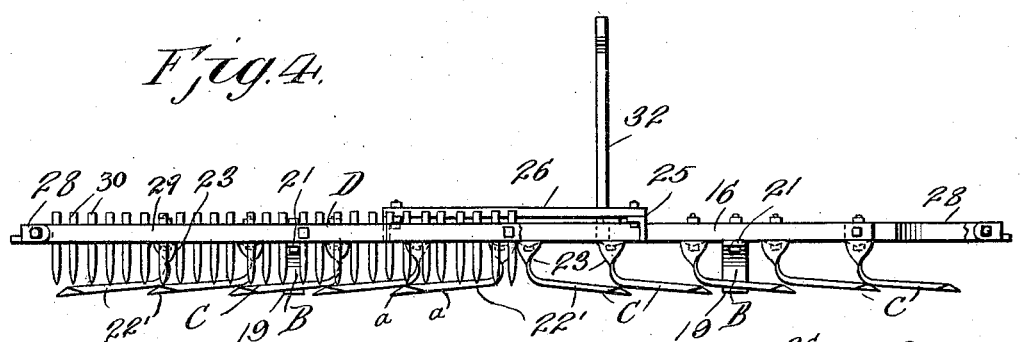
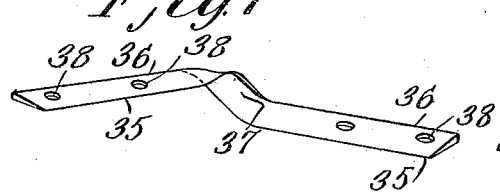
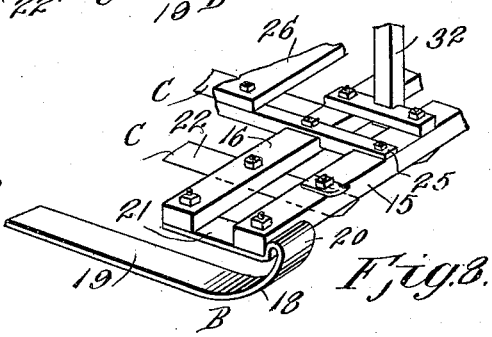
Witnesses
Frank Hough
Wm Bagger
Inventor
Arthur J. Riggs,
By Victor J. Evans
Attorney

UNITED STATES PATENT OFFICE.

ARTHUR J. RIGGS, OF THE DALLES, OREGON.

WEEDER.

1,149,949.   Specification of Letters Patent.   Patented Aug. 10, 1915.

Application filed October 27, 1914. Serial No. 868,874.

*To all whom it may concern:*

Be it known that I, ARTHUR J. RIGGS, a citizen of the United States, residing at The Dalles, in the county of Wasco and State of Oregon, have invented new and useful Improvements in Weeders, of which the following is a specification.

This invention relates to weeders for cutting, destroying and eradicating weeds from cultivated ground, and it has for its object to produce a device of this kind of simple and effective construction whereby the weeds will be cut off below the surface of the ground and thus absolutely destroyed.

A further object of the invention is to provide a device of this class having reversible teeth or cutting members which, after one cutting edge has become dulled or worn out, may be reversed end for end, thereby exposing a fresh cutting edge.

A further object of the invention is to simplify and improve the weed cutting mechanism and the combination therewith of a detachable harrow.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a top plan view of a weeder constructed in accordance with the invention. Fig. 2 is a bottom plan view of the same. Fig. 3 is a longitudinal vertical sectional view taken on the line 3—3 in Fig. 1. Fig. 4 is a rear elevation with parts broken away. Fig. 5 is a perspective detail view of one of the reversible blades. Fig. 6 is a cross sectional view of one of the blades taken on the line 6—6 in Fig. 1. Fig. 7 is a perspective detail view showing a modified form of a reversible blade. Fig. 8 is a perspective detail view of one of the shoes or runners and a portion of the frame.

Corresponding parts in the several figures are denoted by like characters of reference.

The frame of the improved machine is composed mainly of two parallel bars, namely, a front bar 15 and a rear bar 16 which are spaced apart by blocks or spacing members 17. The frame bars 15 and 16 are supported on shoes or runners B, each comprising a curved breast portion 18 having a rearward extending earth engaging slide portion 19 and formed with a neck 20 from which a bracket 21 extends rearwardly to support the frame bars 15, 16 which are bolted on said bracket, being thus supported a short distance above the ground.

The blades or cutting members C are bolted or otherwise firmly secured on the undersides of the frame bars 15, 16. These blades which, as will be clearly seen by reference to Figs. 1 and 2, are made in right and left hand patterns, each consists of an elongated plate or bar of steel which is bent or twisted midway between the ends thereof so as to produce two separate wings 22, 22′ and an intermediate connecting portion 23, whereby said wings are connected and spaced apart. The side edges of the two wings will be disposed at an obtuse angle with respect to each other, as clearly seen in the drawings. The bar or plate from which the blade or cutting member C is produced is preferably of triangular cross section, as clearly seen in Fig. 6, producing two cutting edges *a*, one along each side. In twisting the bar to form the cutting member, the ridge portion is presented inwardly, thus providing each wing with a flat outer face, the flat face of one wing being opposed to the bottom faces of the frame bars 15, 16, while the flat face of the other wing will present a ground engaging surface. Each wing is provided with apertures 24 for the passage of connecting bolts, and it will be readily seen that owing to this construction, each blade is capable of being reversed end for end, and that the wing which is in ground engaging position will always have a forwardly disposed cutting edge. By constructing the cutting blades in the manner described, and in right and left patterns, they may be disposed from the center toward the ends of the frame with the cutting edges presented obliquely in opposite directions, thereby equalizing the draft and the stress on the machine.

Mounted on the frame bars 15, 16 are rearwardly extending arms or brackets 25 supporting a foot board 26 on which the driver or operator may stand. Links or draft rods 27 are connected with and extend forwardly from the forward frame bar 15, and said draft rods support a platform 33.

A harrow frame D is provided, the same consisting of rearwardly divergent side members 28 which are connected together in rear of the cutting blades C by means of bars 29 which are equipped with rake teeth or harrow teeth 30. The forward ends of the side members 28 have lateral extensions 31 that are bolted or otherwise secured on the front face of the rearward frame bar 16. An upwardly extending lever 32 is securely connected with the frame bars 15, 16, between which the lower extremity of said lever is positioned.

In practice, the operator standing on the foot board 26 imparts his weight to the earth engaging wings of the blades or cutting members C, causing said blades to cut beneath the surface of the ground, and thus cutting the stalks of weeds under the ground. The small weeds that are not cut off by the blades will be destroyed by the rake teeth 30. When weeds have accumulated on blades or in the harrow, the operator may step from the foot board 26 to the platform 33 and then manipulate the lever 32, rocking the entire frame, the breast portions 18 of the shoes serving to support the frame structure while being rocked, thereby disengaging the harrow teeth from the accumulated weeds and leaving the same behind. By releasing the pull on the lever 32 and stepping from the platform 33 to the foot board 26, the operation will be resumed.

In Fig. 7 of the drawings there has been shown a modified construction of one of the blades or cutting members, under which the same is formed from an elongated bar or plate provided at the two ends thereof with cutting edges 35 that face in opposite directions and also with oppositely disposed back portions 36, the result being that each wing of the blade will be formed with a cutting edge 35 and with a relatively broad back portion 36; the intermediate connecting portion 37 having a cutting edge on both sides. This form of blade, by providing each wing with apertures 38 for the passage of fastening elements, may be reversed end for end in the same manner as the cutting member heretofore described, and the operation thereof will be substantially the same.

From the foregoing description taken in connection with the drawings hereto annexed, it will be seen that I have produced a very simple, inexpensive and effective weeder whereby weeds may be cut below the surface of the ground and effectively destroyed.

Having thus described the invention, what is claimed as new, is:—

1. In a device of the class described, a frame comprising a pair of parallel bars, and runners supporting the same, said runners having arcuate breast portions on which the frame may rock, and rearwardly extending brackets on which the frame bars are supported.

2. In a device of the class described, a pair of runners having arcuate breast portions, and rearwardly extending brackets, frame bars supported on said brackets, earth engaging cutting members carried by the frame bars, and means whereby the frame bars and cutting members may be tilted to rock on the breast portions of the runners.

3. In a device of the class described, a pair of runners having curved breast portions and rearwardly extending brackets, frame bars supported on the brackets, cutting members supported by the frame bars and having obliquely disposed earth engaging wings, a harrow frame connected with one of the frame bars, said harrow frame being provided with earth engaging teeth, and means whereby the entire frame structure may be tilted to rock in the arcuate breasts of the runners.

4. In a device of the class described, a pair of runners having arcuate breast portions and rearwardly extending brackets, frame bars supported on the brackets, rearwardly extending arms connected with the frame bars, a foot board supported on said arms, cutting blades connected with the frame bars, a harrow frame connected with one of the frame bars, and a tilting lever connected with the frame.

5. In a device of the class described, a pair of runners having arcuate breast portions and rearwardly extending brackets, frame bars supported on the brackets, rearwardly extending arms connected with the frame bars, a foot board supported on the arms, cutting blades connected with the frame bars, a harrow frame connected with one of the frame bars, and a tilting lever connected with the frame; in combination with draft rods extending forwardly from one of the frame bars, and a platform mounted on said draft rods.

In testimony whereof I, affix my signature in presence of two witnesses.

ARTHUR J. RIGGS.

Witnesses:
FRANK G. DICK,
ANNA ZIESCH.